US010046457B2

(12) United States Patent
McHugh et al.

(10) Patent No.: US 10,046,457 B2
(45) Date of Patent: Aug. 14, 2018

(54) SYSTEM AND METHOD FOR THE CREATION AND UTILIZATION OF MULTI-AGENT DYNAMIC SITUATIONAL AWARENESS MODELS (71) Applicant: General Electric Company, Schenectady, NY (US)

(72) Inventors: Justin McHugh, Niskayuna, NY (US); Kareem Sherif Aggour, Niskayuna, NY (US); John Michael Lizzi, Niskayuna, NY (US); Charles Burton Theurer, Alplaus, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/530,399

(22) Filed: Oct. 31, 2014

(65) Prior Publication Data
US 2016/0121483 A1 May 5, 2016

(51) Int. Cl.
*G05B 19/418* (2006.01)
*B25J 9/16* (2006.01)

(52) U.S. Cl.
CPC ..... *B25J 9/163* (2013.01); *G05B 2219/39146* (2013.01); *G05B 2219/40323* (2013.01)

(58) Field of Classification Search
CPC ........ B25J 9/163; B25J 9/0084; B25J 9/1602; B25J 9/1674; B25J 9/1694
See application file for complete search history.

(56) References Cited

U.S. PATENT DOCUMENTS

| 8,346,391 | B1* | 1/2013 | Anhalt | B25J 9/163 |
| | | | | 700/245 |
| 8,621,653 | B2 | 12/2013 | Khosravy et al. | |
| 9,024,771 | B1* | 5/2015 | Kuffner, Jr. | G08B 21/18 |
| | | | | 340/679 |
| 2008/0243305 | A1* | 10/2008 | Lee | B25J 9/1602 |
| | | | | 700/246 |
| 2009/0271034 | A1* | 10/2009 | Kalbavi | B25J 9/0084 |
| | | | | 700/245 |
| 2010/0241260 | A1* | 9/2010 | Kilibarda | B25J 9/1602 |
| | | | | 700/95 |
| 2014/0040292 | A1 | 2/2012 | Basak et al. | |
| 2012/0185090 | A1 | 7/2012 | Sanchez et al. | |
| 2013/0104236 | A1 | 4/2013 | Ray et al. | |
| 2013/0124483 | A1 | 5/2013 | Furuhashi et al. | |

(Continued)

OTHER PUBLICATIONS

Muller, Hausi A. "SoftwaRe Engineering for the Industrial Internet: Situation-Aware Smart Applications", Web Systems Evolution (WSE), 2013 15th IEEE International Symposium, Sep. 2013, ISSN:2160-6153, 1pg.

*Primary Examiner* — Nicholas Kiswanto
(74) *Attorney, Agent, or Firm* — Buckley, Maschott & Talwalkar LLC (57) ABSTRACT

A method, system, and non-transitory computer-readable medium, the method including receiving notifications from a plurality of agents, the notifications being associated with the plurality of agents sensing aspects of an environment; determining, based at least in part on the received notifications from the plurality of agents, a situational model of the environment from the notifications; determining a status of the environment based on the situational model; and reporting the status of the environment to at least one of the plurality of agents.

20 Claims, 4 Drawing Sheets (56) References Cited

U.S. PATENT DOCUMENTS

| | | |
|---|---|---|
| 2013/0191052 A1 | 7/2013 | Fernandez et al. |
| 2013/0226758 A1 | 8/2013 | Reitan |
| 2013/0289995 A1 | 10/2013 | Li et al. |
| 2014/0006338 A1 | 1/2014 | Watson et al. |
| 2014/0269202 A1* | 9/2014 | Dugan .................. A01K 29/005 367/131 |
| 2015/0032257 A1* | 1/2015 | Hashiguchi ................ B25J 9/06 700/248 |
| 2016/0025850 A1* | 1/2016 | Rigsby .................. G01S 13/881 342/61 |

* cited by examiner

RECEIVE NOTIFICATIONS FROM A PLURALITY OF AGENTS, THE NOTIFICATIONS BEING ASSOCIATED WITH THE PLURALITY OF AGENTS AND ONE OR MORE DIFFERENT SENSORS
305

DETERMINE, BASED AT LEAST IN PART ON THE RECEIVED NOTIFICATIONS FROM THE PLURALITY OF AGENTS, A SITUATIONAL MODEL OF A SITUATION OF AN ENVIRONMENT RELATING TO THE NOTIFICATIONS, THE SITUATION BEING DEFINED BY A TOTALITY OF DATA OF THE NOTIFICATIONS RECEIVED AND A TRANSFORMATION OF THAT DATA THAT OCCURS WITHIN THE ENVIRONMENT OVER TIME
310

DETERMINE A STATUS OF THE ENVIRONMENT FROM THE SITUATIONAL MODEL
315

REPORT THE STATUS OF THE ENVIRONMENT TO AT LEAST ONE OF THE PLURALITY OF AGENTS
320

SYSTEM AND METHOD FOR THE CREATION AND UTILIZATION OF MULTI-AGENT DYNAMIC SITUATIONAL AWARENESS MODELS

BACKGROUND

The advent of low-cost sensing and robotics platforms is rapidly leading to an era where dispersed, potentially autonomous, network-connected sensing platforms may be the norm. These platforms, referred to in this document as "Agents", may be used both for physical tasks as well as to sense and provide an indication of detected data points based on arrays of onboard sensors. Each agent, such as an automated machine or a robot, may detect one or more parameters in its local environment and provide an indication of a value or other representation of the detected parameter to other agents in the network. Further, the agent may have the capability to process and/or store the value of the detected parameter and/or the values indicated from other sensors from other agents. In a number of instances, it is beneficial for any one agent to be aware of more than its own collected data and sensing modalities. Ideally, these agents would communicate their observations and these would be arranged into a coherent situational model representing the output of a variety of sensors from a variety of agents, giving each agent a shared 'global' model of their collective situation even though each agent is only able to directly sense a small 'local' subset of the situational model.

This invention pertains to the development of a mechanism and infrastructure to support and facilitate flexible, dynamic communication and coordination between agents, including a mechanism to manage a global situational model of an environment, including the agents themselves. This mechanism provides a means of not only creating and distributing the shared situational model but also allows for its updating over time. Agents and other computing resources engaged in the use of the model are able to be arranged into hierarchies, allowing for varying levels of detail and abstraction to be employed. For maximum effectiveness, the agents must be able to act independently if temporarily severed from the system, falling back on local processing based on the last known model received, storing additional sensing information for communication when eventually reconnected.

SUMMARY

At a high level, the system includes a collection of sensor-enabled agents arranged into a hierarchy (which may be flat), communications network(s), and at least one group of external computing resources used for the integration and maintenance of the shared model. This model is a collective, computable representation of the agents' situation and is most easily described as a transformed representation of all of the received sensor data, external input information, and other programmatically-determined variables. This model, representing the agents' situation, is considered valid over some period of time and periodically updated.

As previously stated, the agents may be arranged into a hierarchy. This allows for individual agents and computing resources related to the system to operate at varying levels of abstraction. These abstractions are facilitated by varying levels of detail and perspective employed in individual representations of the shared model and may be employed for the purposes of reporting, operational compartmentalization, partial re-creation and adjustment of the shared model for use by the lower tiers, and/or command and control of other tiers in the hierarchy.

The computational resources at the top of the hierarchy are responsible for the generation and update of the shared situational model. This is accomplished by processing the sensor data returned by lower tiers and transforming them via heuristic and algorithmic mechanisms. This model is then distributed downward through the hierarchy, potentially being manipulated by computational resources in lower tiers as it is dispensed.

The hierarchy and associated differentiated levels of abstraction employed may be utilized to facilitate reporting tasks. These tasks are accomplished via modeling the reporting tasks as transformations on the current situational model which are then communicated at a degree of abstraction suitable for the requestor.

In some embodiments, a method includes receiving, by a processor, notifications from a plurality of agents, the notifications being associated with the plurality of agents and one or more different sensors; determining, by the processor and based at least in part on the received notifications from the plurality of agents, a situational model of an environment from the notifications; determining, by the processor, a status of the environment from the situational model; and reporting the status of the environment to at least one of the plurality of agents.

In some embodiments, a non-transitory computer-readable medium includes instructions to receive notifications from a plurality of agents, the notifications being associated with the plurality of agents and one or more sensors; instructions to determine, based at least in part on the received notifications from the plurality of agents, a situational model of an environment from the notifications; instructions to determine a status of the environment from the situational model; and instructions to report the status of the environment to at least one of the plurality of agents.

In some embodiments, a system includes a storage device; a processor in communication with the storage device and operable to: receive notifications from a plurality of agents, the notifications being associated with the plurality of agents and one or more sensors; determine, based at least in part on the received notifications from the plurality of agents, a situational model of the environment from the notifications; determine a status of the environment using the situational model; and report the status of the environment to at least one of the plurality of agents.

DESCRIPTION

Some embodiments herein relate to a method and system for providing a framework for the construction of a shared situational model that may be accessed and used by a plurality of agents, and interactions with a human user on a level of abstraction desired and beneficial to the human user for communication with the system, both as direction and reporting tasks. The plurality of agents may be autonomous or semi-autonomous devices operating in one or more locations of interest to the construction of the shared situational model. The agents, which may be robots, automated monitoring systems, devices having a sensor or observation functionality, and the like which each have at least one associated sensor or observational unit that obtains a measurement of an environmental or other parameter being monitored by the agent. The plurality of agents may be operating in a shared physical space. The plurality of agents may or may not be the same or similar types and/or may employ a variety of sensing modalities. The agents may be concerned with different, disjoint tasks.

In some aspects, the individual agents, in cooperation with the sensors associated therewith, may monitor one or more parameters and process the sensor data using processing capabilities of the respective individual agent. For example, an agent may include one or more processing cores and a memory unit for the storage of executable instructions and/or sensor data, including pre-processed and post-processed sensor data. That is, the agents herein may be capable of, or include functionality for, at least one of, obtaining, processing, storing, and reporting sensor data independently of other agents, controllers, servers, applications, and services.

In some aspects, a framework disclosed herein may combine and process sensor data from the plurality of agents into a cohesive situational model of an environment that can be shared amongst the plurality of agents. The sensor data may be diverse and non-homogeneous given the potential of variety amongst the plurality of agents. In some aspects, the data from the plurality of agents (and the sensor sets associated therewith) may be aggregated prior to one or more processing operations herein.

As used herein, a situation may refer to a totality of the sensor data (e.g., notifications) digested by a process, system, or device herein and a transformation of that data, augmented by outside information, which occurs within a particular environment over time. A situation is not necessarily limited to a physical location but may be a transformation related to one or more physical spaces or locations that are monitored by a plurality of agents, where the different locations in the sensing range to the plurality of agents may be diverse. Furthermore, the global environment associated with a particular situation may comprise or otherwise encompass the one or more locations associated with the plurality of agents providing data that contributes to a determination of a situational model and the dynamic status updating thereof.

In some embodiments, a global environment may include a plurality of agents, where the agents have one or more sensors associated therewith. The plurality of agents may be configured to monitor and provide indications or notifications of different aspects of the global environment. As used herein, a global environment (also referred to simply as an environment herein unless stated otherwise) refers to a totality of the locations and duration to be modeled. As used herein, an aspect of an environment may refer to a portion, a characteristic, or feature of the environment. For example, an "aspect" of an environment may include data relating to a temperature differential within the environment, a physical location and/or a proximity of fixed or moving assets or entities to each other or a reference point, a location of moisture within the environment, etc.

Figure 1:
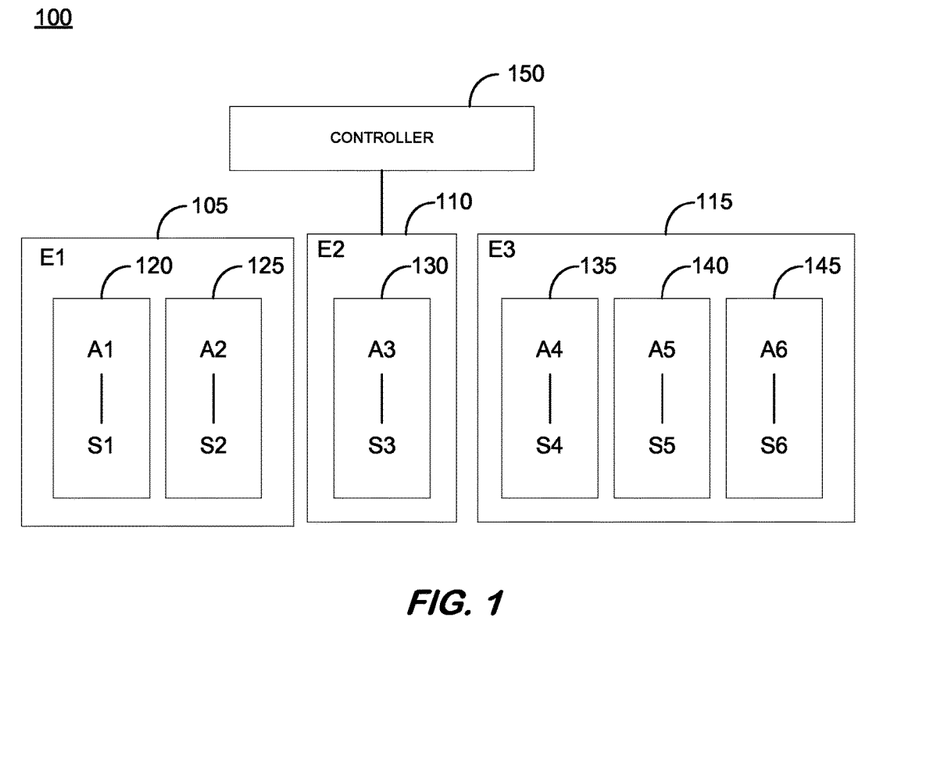
FIG. 1 is an illustrative framework, according to some embodiments.

FIG. 1 is an illustrative depiction of a logical representation of a framework 100 for providing a shared situational model for use by a collection of agents, in accordance with some embodiments herein. The logical representation of the framework depicted in FIG. 1 is an abstraction of the framework. Accordingly, the logical representation of FIG. 1 is not limited to a particular physical embodiment of the framework.

FIG. 1 includes a framework 100. Framework 100 includes a plurality of locations (L), including location 105 (L1), location 110 (L2), and location 115 (L3). Each location of FIG. 1 includes at least one agent. Each of the agents has one or more sensors to monitor parameters in its associated location vicinity. For example, agent 120 (A1) includes a sensor S1 to monitor parameters in location L1 and agent 125 (A2) includes a sensor S2 to monitor parameters also in location L1. Location L2 (110) is associated with agent 130 (A3) and its sensor S3. Location 115 (L3) is associated with agents 135 (A4), 140 (A5), and 145 (A6). In some embodiments, the sensors shown in FIG. 1 may include a set or collection of sensors (i.e., more than one sensor). The locations, agents, and sensors in FIG. 1 are example representations thereof. More, fewer, and alternatives of the locations, agents, and sensors may be provided without any loss of generality.

In some aspects, the agents herein may obtain, process, and/or generate data relating to different aspects within an environment. In some aspects, the agents herein may obtain, process, and/or generate data relating to the same or similar types of aspects of an environment but in different locations within the environment. In some embodiments, the agents herein may obtain, process, and/or generate data relating to a combination of aspects and locations within an environment. For example, in some embodiments herein different sensor modalities may be used within the same area or location and/or the same type of sensors may be used across multiple different locations, where the data obtained using the sensors may be used to model a global environment by a situational model that may be shared amongst the agents associated with the sensors.

FIG. 1 further includes a common controller 150. Controller 150 is networked to communicate with and to share information with the plurality of agents included in framework 100. The controller is responsible with the synthesis of the situational context distributed to the agents. In some aspects, the agents in the framework may communicate directly and indirectly with controller 150, as well as with other agents in the framework using any communication protocol now known or that becomes known in the future. In some aspects, controller 150 may push or otherwise transmit information (e.g., instructions, messages, directives, etc.) to one or more of the agents in framework 100. In a "push" communication mode, the information may be transmitted to an intended agent where the intended agent did not necessarily first request the information. In some instances, information may be transmitted to one or more of the agents on an as-needed basis as determined by, for example, the controller.

In one aspect herein, sensor information may be transmitted from the agents to the controller, either directly or indirectly (e.g., from agent 120 to agent 125 and then to controller 150). The agents may "push" the sensor data to controller 150 as it is obtained and processed by the individual agents and/or on a scheduled basis, where the schedule may be determined by the agents alone, the controller alone, or a combination of the agents and the controller. In some instances, controller 150 need not specifically request the sensor information in order for the agents to transmit the sensor data to the controller, receiving the data through either an agent hierarchy, a side channel communication or gleaned from a repository to which agent observations are stored.

In some embodiments, the sensor data obtained by the agents may be received by controller 150 and used to determine a shared, situational model of a situation relating to global environment 101. The situation may relate to global environment 101 including one or more of the locations 105, 110, and 115. In some embodiments, the global environment may include a sub-set of the locations 105, 110, and 115. In some instances, data received by controller 150 may be used to determine one or more situations relating to one or more of the locations of FIG. 1. For example, controller 150 may determine a situational model regarding the safety of a global environment concerning an exposure to radiation. The global environment may comprise data from locations 105, 110, and 115 in a first situational model and data from locations 105 and 115 in a second situational model concerning a radiation exposure. In some embodiments, sensor data (i.e., notifications) may be received from all sensors of the locations 105, 110, and 115 even though a global environment of interest may not necessarily include all of the locations 105, 110, and 115.

In some instances, agents included in framework 100 may be informed of a status of a modeled situation and information relating thereto as known or determined by controller 150. The agents thus informed may use the information to facilitate their decision-making and actions. In some aspects, the agents of framework 100 may access information relating to the modeled situation and use the accessed information to facilitate their decision-making and actions. For example, a situational model including a temperature aspect that may be determined by controller 150 for the environment 101 based on temperature-related data (e.g., notifications) received from agents 120, 125, 135, 140, and 145 that have sensors capable of detecting a temperature. A status may be determined for environment 101 based on the situational model and the data from the reporting agents. The determined status of environment 101 may be communicated to agent 130, wherein agent 130 having been informed of the status may use the status of the environment in performing its intended tasks or operations (e.g., power generation regulation).

Figure 2:
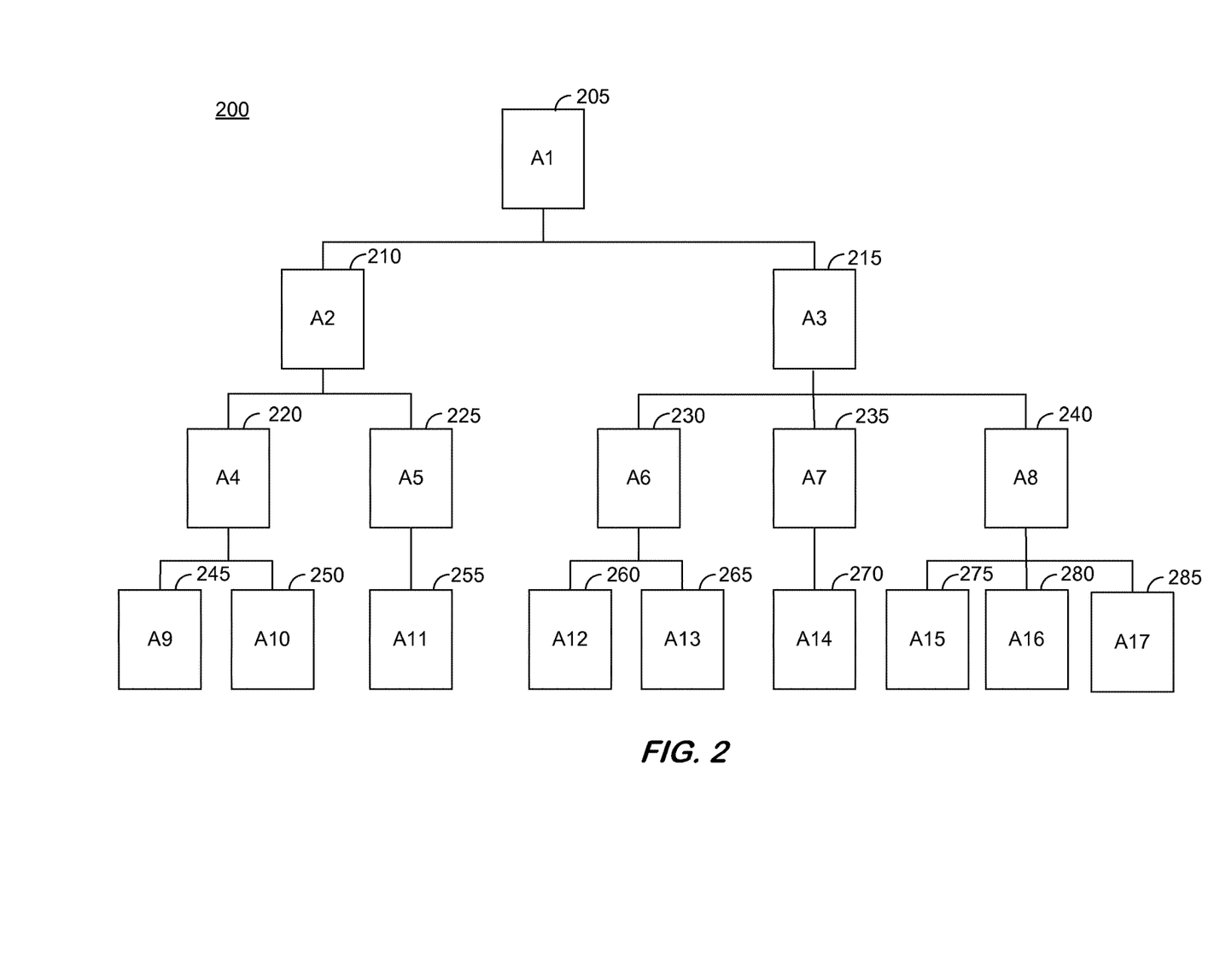
FIG. 2 is an illustrative hierarchical framework, according to some embodiments.

In some embodiments, individual agents of a framework in accordance with some aspects herein may be organized into ranked categories or groupings. In some instances, a plurality of agents may be configured into a hierarchy wherein agents are arranged into ranked groupings. Referring to FIG. 2, there is depicted a framework 200. Framework 200 is a logical representation (i.e., an abstraction) of a configuration embodiment relating a plurality of agents and a common controller, where the framework facilitates the construction of a shared, global situational model concerning situation(s) and informing or providing insight regarding the modeled situation(s). This is then distributed to the hierarchy, augmented or simplified at various levels in accordance to the needs of the sub-regions of the hierarchy, as determined by the top-level agent of each sub-regions.

According to FIG. 2, framework 200 includes a plurality of agents configured into a hierarchy where the agents are arranged into ranked groupings. In some embodiments, framework 200 is an abstract representation of a hierarchical, tree structure configuration of the illustrated agents. As an abstract, logical representation of the configuration of the agents, the lines between the agents in FIG. 2 are not intended to represent lines or channels of communication between agents. In some embodiments, agents in accordance with the present disclosure may be configured in hierarchies other than and different than the tree structure of FIG. 2.

As shown, agent 205 is a top-most (i.e., root node) agent. Agent 205 is said to be the highest ranking agent in framework 200 (e.g., rank=4). Agent 205 is associated with controller 207. Controller 207 may determine, calculate, or generate a situational model and communicate a status of a given environment as determined using the situational model. Still referring to FIG. 2, agents 210 and 215 are logically grouped together and have a same rank (e.g., rank=3). Framework 200 also includes agents 220, 225, 230, 235, and 240 that are logically grouped together and have a rank=2, whereas agents 245, 250, 255, 260, 265, 270, 275, and 280 are logically grouped together with a lower ranking=1.

In some aspects, framework 200 is not a fully centralized management system. The various agents comprising framework 200 may continue, as applicable to the function of the individual agents and the framework, to perform local processing functions to achieve the goals and functions of the individual agents. In some aspects, the one or more of the agents depicted in FIG. 2 may include processing functionality, either local or distributed, that provides a mechanism for the agent(s) to process data.

In an aspect herein, the tasks, communication messages, and actions of higher ranked agents and controllers may have a priority over other agents and controllers of a lower rank (one controller shown in FIG. 2, although additional controllers may be present in some embodiments). For example, a notification from a rank=2 agent (e.g. 220, 225, 230, 235, and 240) may have priority over a notification from a rank=1 agent (e.g. agents 245, 250, 255, 260, 265, 270, 275, and 280). In some embodiments, an agent and another agent (or controller) having a same rank are treated with equal priority. In some embodiments, where an agent and another agent (or controller) have the same rank, a first agent may be granted a preference over a second, similarly ranked agent. Other priority determination logic of the framework may result in the similarly ranked second agent having a preference over the first agent, in some embodiments. In some embodiments, one or more controllers of the framework may implement the priority determination logic for the network. In some embodiments, the modeled situation determined by framework 200 may be, at least in part, a determining factor in how the priority determination logic of the framework is enacted. That is, a first modeled situation may use a first priority determination logic for the framework while a second modeled situation may use an alternate priority determination logic for the framework.

In some aspects, the ranks of the agents' organization may require differing levels of generality and detail in representations of the determined/computed model at different levels of the framework. In this manner, communication needs across the collection of agents may be reduced or minimized. In some instances, agents may communicate up or down the hierarchy of the framework. In some embodiments, agents may communicate with agents within other parts of the hierarchy under the local and granular control of the agents, without a necessary need to involve the situational modeler (i.e., the controller 207). In this regard, framework 200 may provide collective sensor inputs to a shared global model and local coordination of activities by and between the agents of the framework. In some embodiments, peer activity between one or more of the plurality of agents of a framework (e.g., 100, 200) may be performed without coordination of a controller of the framework. The agents remain able to operate independently without the direct control of the processor responsible for assembling the global situational model. In some aspects, the agents are able to fall back on using cached versions of the situational model, should one already exist, and potentially store observations for reporting to the processor when available.

In some embodiments, a level of abstraction of notifications and sensor data provided by agents to controller(s) of a framework is determined, at least in part, based on the relative hierarchy of an associated agent. For example, rank=1 agents (i.e., agents 245, 250, 255, 260, 265, 270, 275, and 280) may provide the most detail regarding their notifications, whereas agents having a rank=3 (i.e., agents 210, 215) may provide less details regarding the notifications they report since, for instance, the rank=3 agents exist at a higher abstraction plane of the framework. In some embodiments, the greater the abstraction, then the greater the overview and less detailed information that may be included in the information reported at a particular hierarchical level. As the levels of abstraction increase, the information may be increasingly represented in a manner that is likely to be understood by a human user (e.g., more human user-interface understandable representations).

In some embodiments, the determination of the status of the modeled situation may be integrated into framework 200 such that, for example, the determination of the status of the situation is provided prior to a reporting of the status. In some instances, the determination of the status of the situation modeled by a situational model herein may be made prior to a request for the reporting of the status by a user or external system. That is, the determination may be provided or performed pre-processing of a report or a request for a reporting of the status of the situation modeled by the situational model. In this manner, post-processing of a notification and a status of a modeled situation may be limited (or eliminated) by having the notification and the status of the modeled situation pre-processed to an appropriate level of abstraction corresponding to the level of the associated agents and controller(s). This level of abstraction is tailored to suit the assumed granularity requirements of the party requesting the report. This requires the reporting entity have some model or set of models used to determine required granularity, which may be submitted/augmented at the time of request.

In some embodiments, the determining of the situational model by a framework in accordance with aspects herein may be dynamically updated based, at least in part, on the received notifications from the agents of the framework, without disruption of notification processing by the plurality of agents. That is, in some instances, the determining of the situational model by the framework is done by the controller system, independently of the individual operations of the agents comprising the framework. Likewise, the agents comprising the framework may continue to process sensor data independently of the operations of the situational modeler in some embodiments herein.

In some aspects, frameworks disclosed herein may provide a mechanism to process disjoint notifications (e.g., sensor observations) provided by a plurality of agents and their associated sensor collections in an efficient manner. The use of disjoint notifications allows the agents to obtain information about a situation which are potentially impossible to acquire on their own. The observations may be disjoint in terms of the sensing apparatus in use and/or the proximity in terms of time or location of the observed quantities. A framework herein may have one or more controllers grouped as a single logical controller to determine and update a model of a situation (i.e., a situational model). In some aspects, controller(s) of a framework may have greater processing and/or storage capabilities than the agents comprising the framework. Moreover, framework controller(s) may have greater access to data (e.g., direct provisioning of notifications from all of the agents and their associated sensor sets) related to the framework than any one or group of agents in the framework.

In some aspects, a framework herein may improve, update, or otherwise modify a modeled situation without necessarily changing (e.g., operating instructions, commands, applications, etc.) or updating agent(s) comprising the framework. In some instances, the controller(s) of the framework may issue commands and directives to the agents of a framework to implement new instructions, modifications to instructions, and/or updates to the agents, as determined by the controller in accordance with the modeled situation and/or the dynamically evolving status of the modeled situation.

Referring to FIGS. 1 and 2, it is noted that agents of the frameworks 100 and 200 may continue, as applicable, to perform local processing tasks as needed to accomplish the objectives of the respective agents. In some aspects, coordination between peer agents may not be a requirement and peer agents may operate independently of each other, at least when not connected or in limited communication with each other and/or the situational modeler (e.g., common controller). In some embodiments one or more capabilities of a framework agent may be enhanced by the connectivity with the common controller and the shared situational state shared thereby. Furthermore, at least some of the agents of the framework may resume or continue their autonomous or semi-autonomous operation and local processing when access to the framework's controller(s) is lost or limited. In some aspects, local processing by an agent may include the determination, on a local basis for the agent itself, of a model to the degree appropriate and applicable to the agent.

In some embodiments, a human may be considered a specialized type of agent. In some regards, the human will have at least one sensor associated therewith. The at least one sensor may be worn or attached to the person of the human agent in the form of, for example, a wearable environmental monitoring device or system.

In some aspects, a human user may initiate an action by a framework's controller. For example, a user may query the controller for a value or other global environment status as represented by the situational model. In an instance where the controller does not have a suitable current representation of the requested or queried value, the controller can issue commands and directives to the agents in an effort to satisfy the query. The controller may push commands, messages, requests, and directives to the appropriate agents that can process them to fulfill the query. In some cases, a human user may request a change environment related to the modeled situation. The controller(s) of the framework may operate to determine whether the request is feasible based on the modeled situation, and further how to best implement the request. Thereafter, the controller(s) may push commands, messages, requests, and directives to the appropriate agents that can process them to fulfill the request.

In some embodiments, a human user may interact with a framework herein at a level of abstraction appropriate for the user's responsibility. For example, a business manager may simply speak or type in a query regarding a monitored automated HVAC system, without a need to specify a particular sub-system or component by its specific name since the manager may want/need to know an overall status of the system being monitored, as opposed to detailed component/sub-system statuses. The framework herein may be designed and implemented to understand the "plain language" queries of the user and issue directives to the framework in response to the user's queries. Additionally, as stated earlier, the frameworks herein may report a status of a situation or a notification with a certain level of abstraction. For example, the framework may report a response to the user's query request as a spoken response indicating the status of the subject system, as determined by the situational model.

Figure 3:
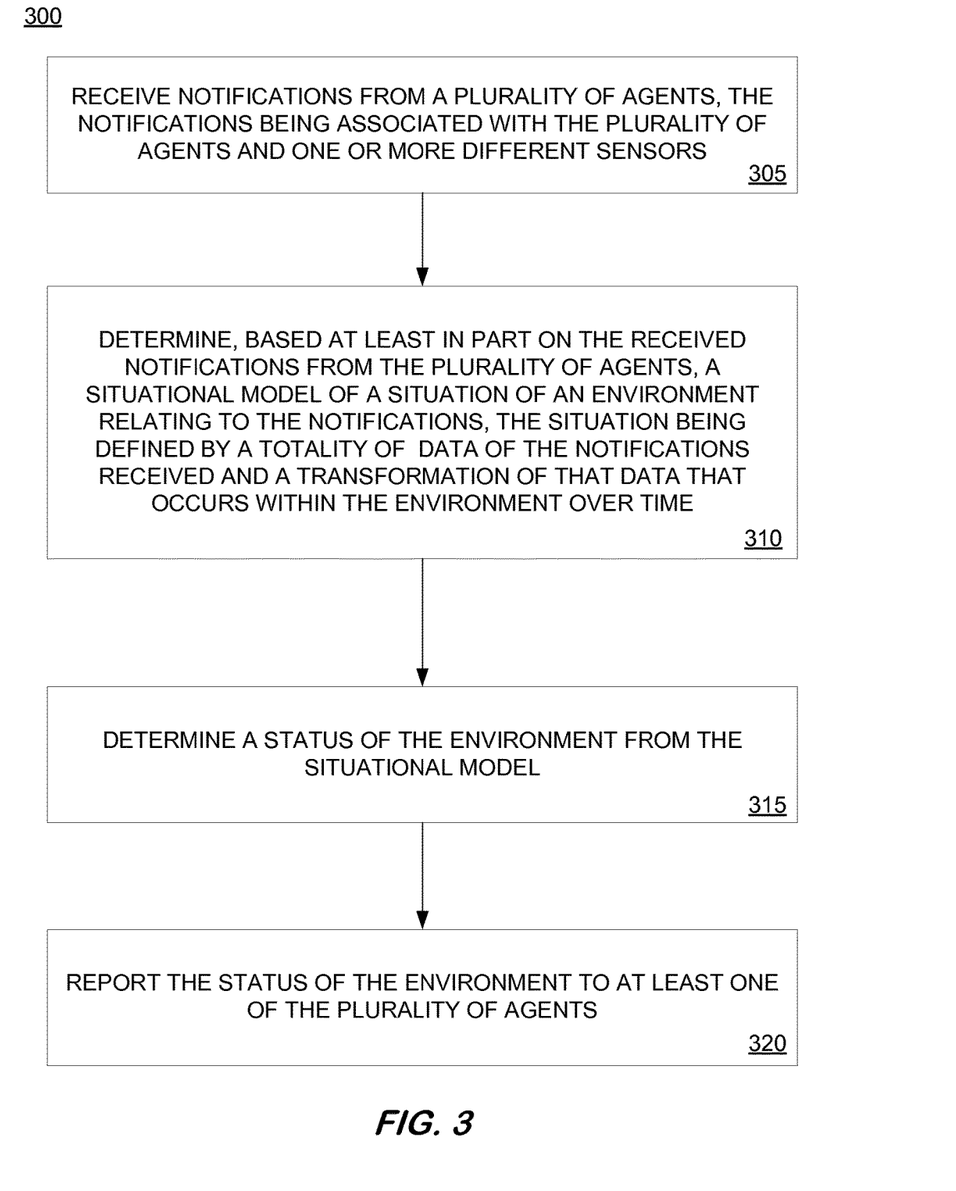
FIG. 3 is a flow diagram of a process, according to some embodiments.

FIG. 3 is an illustrative process 300, according to some embodiments herein. At operation 305, a controller of a framework (e.g., 100, 200) receives notifications from a plurality of agents comprising the framework. In some regards, the agents may be monitoring or performing disjoint tasks in different environments. The notifications may be related to one or more different types of notifications received from one or more different sensors that may be in the form of an alert, a message, an instruction, a command, and the like. In some embodiments, the sensors may be of the same or differing types. The notifications are associated with the plurality of agents and the locations corresponding to the agents. In some aspects, the notifications are configured to be compatible with the framework for reception and processing by the framework. The particular configuration, type, and communication protocol of the notifications may vary though.

At operation 310, the controller of the framework determines a situational model of a global environment that relates to the notifications. In some aspects, the global environment of the modeled situation may include some sub-set of the locations associated with the notifications. The controller(s) of the framework may operate to receive and process the notifications, including but not limited to determining the applicability and weight to be accorded to each of the notifications in determining the situational model(s), as well as updating of the modeled situation based on future notifications. The modeled situation may be developed based on notifications that track observations gathered over a period of time, where the period of time may be predetermined or adjusted based on, for example, the number, strength, and values of the notifications, as well as other considerations.

At operation 315, process 300 performs a determination of a status of the situation modeled in operation 310. The status may be updated continuously or periodically based on the continued or periodic reception of updated notifications as well as determinations by the controller on when a measured quantity differs sufficiently from the currently-used model to merit an update. As notifications are received by the controller, the status of the situation may evolve. Also, some embodiments include an iterative process wherein the model itself may be updated, at least in part, depending on the notifications received by the controller.

In some instances, when a threshold number, type, or notifications having sufficient reliability are received by the controller at operation 305, the model may be updated, modified, or enhanced at operation 310 to accurately account for the recent, updated notifications. Operation 315 may then determine a status based on the currently updated, modified, or enhanced modeled situation.

Whether an initial status determination or an updated status determination, operation 320 provides a mechanism for reporting the status of the modeled situation to at least one of the plurality of agents. In some instances, the status may also be reported to other controllers in the framework to maintain consistency. The configuration of the status reporting may be adaptively adjusted by the controller to match the level of abstraction of the intended recipient (e.g., agent, controller, human agent) so that the intended recipient need not further process the reported status.

As an illustrative use-case, and not a limitation hereof, a framework in accordance with aspects herein may facilitate the mapping and self-directed management of agents in a dynamic environment by autonomous and semi-autonomous agents. The subject agents may be arbitrarily dispersed in an environment and operable to send their observations to the controller of the framework. This notification data may be processed and combined into a representation of the environment shared amongst the agents. As the returned data accumulates and is processed by the controller, the level of detail related to the shared environment may improve, thereby allowing agents that have not been to a region of the global environment to have an accurate map of those areas. As conditions change, for example a landmark is moved by an external event, the agents may be capable of relaying this change information back to the situational modeler (i.e., controller). Illustrative of the discussion above, once some reliable number of agents have noted the change, or the change is noted over some sufficient period of time (as determined by appropriate and applicable factors of consideration herein), the controller may transmit or push out an update informing the collection of agents that there has been a meaningful change in the global environment. This change may be communicated to humans at an appropriate level of abstraction (e.g., "as of 0100 May 3, 2013 the #3 CT scanner is now in room 207"). In a context where the situational model describes a transformation associated with the environment that occurs over a period of time, such transformations may be informed by the introduction of data by way of the agents reporting to the system or other external data source indicating a meaningful change between the currently-calculated state of the situational model and the related environment.

In some aspects, the present disclosure provides a mechanism for agents of a framework in accordance herewith to use data collected by other agents without a need to actively request the data. In an instance that different agents contain different sensor packages, this aspect can be treated as a meta-sensor since the agent may be provided with access to up-to-date data in a situation for a quantity that it cannot directly measure. If such data is included in the situational model, an agent may use information in the global situational state to determine new areas it may be capable of operating in without the need first go to an area or otherwise have direct knowledge of the new area.

Embodiments herein may also provide a mechanism for the rapid introduction of not just new agents but new types of agents, where the framework may be reliant on the pre-existence of a capability to appropriately handle data to be received from the new types of agents and communicated thereto by the framework. In this manner, rapid deployment of new types of agents may be accommodated by embodiments of some frameworks herein.

In one embodiment, the present disclosure provides a mechanism for a dynamic recalculation of otherwise expensive global situational information. An illustrative, non-limiting example is a collection of RFID (radio frequency identification) tags placed on structural components and functional objects in a hospital that are used to create a map of the structural components and functional objects and their correct location. Using a framework of the present system that includes agents that monitor the RFID tags, the remapping (i.e., modeling) could be performed continuously. In an instance a reported item's location differs from its expected location, this change can be noted. When sufficiently reliable data regarding the location change has been received by the controller of the framework, the controller may remap the environment, all without disrupting the on-going processing of the agents included in the framework.

In some embodiments, process 300 and other processes mentioned herein may be embodied in processor-executable program instructions stored on and read from one or more non-transitory computer-readable media, such as a floppy disk, a CD-ROM, a DVD-ROM, a Flash drive, and a solid state drive, and may be stored in a compressed, un-compiled and/or encrypted format. In some embodiments, hard-wired circuitry may be used in place of, or in combination with, program code or instructions for implementation of processes according to some embodiments. Embodiments are therefore not limited to any specific combination of hardware and software.

Figure 4:
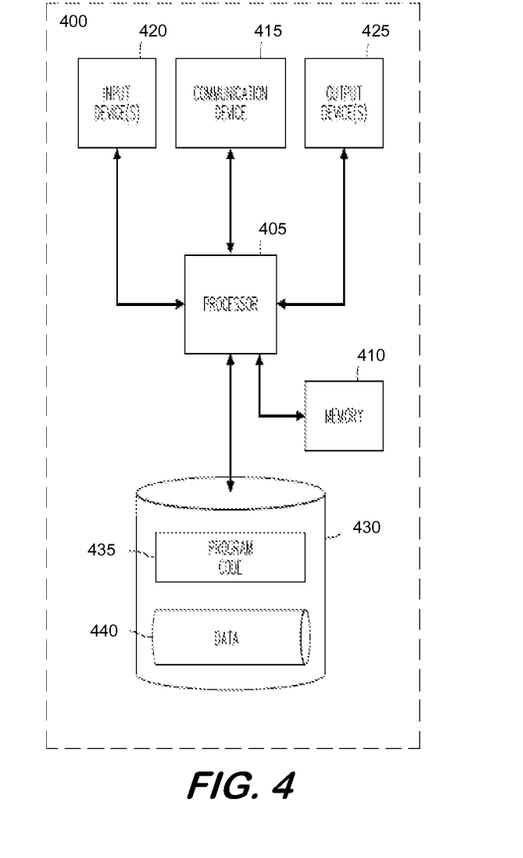
FIG. 4 is a block diagram of a system according to some embodiments.

FIG. 4 is a block diagram overview of a system or apparatus 400 according to some embodiments. System 400 may be, for example, associated with any of the devices described herein, including for example a controller (e.g., FIG. 1, 150; FIG. 2, 240, 270, 280) and like functionality in accordance with processes disclosed herein. System 400 comprises a processor 405, such as one or more commercially available Central Processing Units (CPUs) in the form of one-chip microprocessors or a multi-core processor, coupled to a communication device 415 configured to communicate via a communication network (not shown in FIG. 4) to another device or system (e.g., an agent device and one or more sensor sets). In the instance system 400 comprises a server (e.g., supporting the functions and services provided by a controller), communication device 415 may provide a mechanism for system 400 to interface with another device, system, or service (e.g., another controller and/or an agent device). System 400 may also include a local memory 410, such as RAM memory modules. The system further includes an input device 420 (e.g., a touchscreen, mouse and/or keyboard to enter content) and an output device 425 (e.g., a touchscreen, a computer monitor to display, a LCD display).

Processor 405 communicates with a storage device 430. Storage device 430 may comprise any appropriate information storage device, including combinations of magnetic storage devices (e.g., a hard disk drive), optical storage devices, solid state drives, and/or semiconductor memory, flash memory, and other non-transitory media and devices. In some embodiments, storage device 430 may comprise a database system.

Storage device 430 may store program code or instructions 435 that may provide computer executable instructions for determining a situational model, determining a status of the situational model, updating the modeled situation, and providing reports regarding a status of the modeled situation, in accordance with processes herein. Processor 405 may perform the instructions of the program instructions 435 to thereby operate in accordance with any of the embodiments described herein. Program code 435 may be stored in a compressed, un-compiled and/or encrypted format. Program code 435 may furthermore include other program elements, such as an operating system, a database management system, and/or device drivers used by the processor 405 to interface with, for example, peripheral devices (e.g., agents). Storage device 430 may also include data 440 such as notification data or hierarchy priority look-up tables, including stored situational models. Data 440 may be used by system 400, in some aspects, in performing one or more of the processes herein, including individual processes, individual operations of those processes, and combinations of the individual processes and the individual process operations.

All systems and processes discussed herein may be embodied in program instructions stored on one or more non-transitory computer-readable, processor-executable media. Such media may include, for example, a solid state drive, a floppy disk, a CD-ROM, a DVD-ROM, magnetic tape, solid state Random Access Memory (RAM) or Read Only Memory (ROM) storage units, and flash memory. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

An illustrative example of a practical application of the collection of models is the management of assets and safety concerns within a factory facility which sees frequent remodeling. In such a scenario, agents of multiple types could be dispersed into the environment, identified by those which:

1. Mobile, autonomous sensor and processing platforms capable of navigating the environment; 2. Fixed-position sensor array capable of communicating sensor data to a centralized location; 3. Sensor and processing packages, a communication system and danger warning system worn by human operators acting at the site; and 4. RFID tags placed on landmark or capital machinery for which information on location and position is desired.

These agents are put into operation in the environment with the ability to communicate the position at which the readings are taken, enabling the data returned by these agents to be used to form a map of the site. The paths taken by different types of agents (human and autonomous/assisted) can be used to determine navigable areas and flows of materials and traffic. Returned data from mobile agents sensing the signal from RFID tags on capital parts can be used to inform mapping information on the location of that equipment over time. As data is accumulated from the various sensing platforms, a model of the typical operations and environmental conditions can be established.

When new agents enter the site (both human and machine), the situational modeler can inform them of the latest state of the environment, bootstrapping their ability to navigate and operate at the site.

Returned data from the various agents can be used to create advisories about conditions found at the site and facilitate safe and smooth operations. For instance, the detection of a potential safety fault by one of the stationary agents, such as a liquid nitrogen leak, would be reported to the controller as data from a chemical or temperature sensor. The controller may decide that this makes the location in question unsafe for humans and certain other mobile agents and issue an advisory complete with an updated model of the situation. This would allow recipients which have no independent means of sensing such an event to avoid a potentially dangerous situation.

Returned data can also be used to determine changes in the physical layout of the site. If a structural drawing consulted by the situational modeler indicates that a physical obstruction, such as a wall, prevents free movement but returned positional data suggests that agents are moving through this area, the modeler may update the model to indicate this area is passable. Similarly, the system may update the location of capital machinery based on data returned by agents. In the event that the current model suggests a capital part is located in area A but the returned data from agents able to sense an RFID tag placed on the item locate it at area B, the modeler may, after some threshold is met, move the position of the item in the model itself, effectively informing all of the agents of the new location.

Reporting can be provided to the administration by allowing users to query the state of the environment via the situational model, communicated at a level-of-abstraction predetermined as being suitable for a human user. An example of such a query is the location of a particular piece of equipment.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
   receiving, by a processor, notifications from a plurality of agents, the notifications being associated with respective individual agents of the plurality of agents and one or more different sensors of each of the respective individual agents which, independently of the other individual agents, monitor one or more parameters and process sensor data from their one or more sensors;
   generating, by the processor and based at least in part on a processing of a combination of a totality of the received notifications from the plurality of agents, a shared situational model of a situation of a global environment relating to the notifications, the situation of the global environment being defined by a totality of the notifications received and a transformation of data related to the notifications that occurs within the global environment as the sensor data changes over a period of time, where the global environment relates to one or more physical spaces monitored by the plurality of agents;
   determining, by the processor, a status of the global environment from the shared situational model;
   reporting the status of the global environment to at least one agent of the plurality of agents; and
   processing and using, by the at least one agent of the plurality of agents, the determined and reported status of the global environment as a basis of a decision-making and an action by the at least one agent.

2. The method of claim 1, wherein the determining of a status of the global environment comprises representing the calculated status at a certain level of abstraction, prior to the reporting, and involves a request for a reporting of the status.

3. The method of claim 1, wherein a notification received from one of the plurality of agents is used in at least one of generating the status of the global environment and transmitted to at least one other agent of the plurality of agents for use thereby.

4. The method of claim 1, wherein at least two of the plurality of agents provides notifications relate to disjoint tasks.

5. The method of claim 1, wherein peer activity between the plurality of agents can be performed without coordination of the processor.

6. The method of claim 1, wherein the plurality of agents are logically grouped into a hierarchy of ranked categories, facilitating various patterns of control of information, both to and from the processor, allowing for differing levels of abstraction to be utilized at different ranks.

7. The method of claim 1, wherein the determining of the shared situational model of the related global environment is dynamically updated based, at least in part, on the notifications received from the plurality of agents over the period of time without disruption of notification processing by the plurality of agents.

8. A non-transitory computer-readable medium having executable instructions stored thereon, the medium comprising:
   instructions to receive notifications from a plurality of agents, the notifications being associated with respective individual agents of the plurality of agents and one or more different sensors of each of the respective individual agents which, independently of the other individual agents, monitor one or more parameters and process sensor data from their one or more sensors;
   instructions to generate, based at least in part on a processing of a combination of a totality of the received notifications from the plurality of agents, a shared situational model of a situation of a global environment relating to the notifications, the situation of the global environment being defined by a totality of the notifications received and a transformation of data related to the notifications that occurs within the global environment as the sensor data changes over time, where the global environment relates to one or more physical spaces monitored by the plurality of agents;
   instructions to determine a status of the global environment from the shared situational model; and
   instructions to report the status of the global environment to at least one agent of the plurality of agents, the at least one agent of the plurality of agents to process and use the determined and reported status of the global environment as a basis of a decision-making and an action of the at least one agent.

9. The medium of claim 8, wherein the determining of a status of the global environment comprises representing the calculated status at a certain level of abstraction, prior to the reporting, and involves a request for a reporting of the status based on a mutable collection of profiles, potentially supplied at runtime, to determine applicable levels of abstraction for a given report.

10. The medium of claim 8, wherein a notification received from one of the plurality of agents is used in at least one of generating the status of the global environment and transmitted to at least one other agent of the plurality of agents for use thereby.

11. The medium of claim 8, wherein at least two of the plurality of agents provides notifications related to disjoint tasks.

12. The medium of claim 8, wherein each of the plurality of agents performs local processing to achieve individual objectives of each respective agent.

13. The medium of claim 8, wherein the plurality of agents are logically grouped into a hierarchy of ranked categories, facilitating various patterns of control of information, both to and from the processor, allowing for differing levels of abstraction to be utilized at different ranks.

14. The medium of claim 8, wherein the determining of the shared situational model of the related global environment is dynamically updated based, at least in part, on the notifications received from the plurality of agents over the period of time without disruption of notification processing by the plurality of agents.

15. A system comprising:
a storage device;
a processor in communication with the storage device and operable to:
  receive notifications from a plurality of agents, the notifications being associated with respective individual agents of the plurality of agents and the respective individual agent's one or more different sensors of each of the respective individual agents which, independently of the other individual agents, monitor one or more parameters and process sensor data from their one or more sensors;
  generate, based at least in part on a processing of a combination of a totality of the received notifications from the plurality of agents, a shared situational model of a situation of a global environment relating to the notifications, the situation of the global environment being defined by a totality of the notifications received and a transformation of data related to the notifications that occurs within the global environment as the sensor data changes over a period of time where the global environment relates to one or more physical spaces monitored by the plurality of agents;
  determine a status of the global environment from the shared situational model;
  report the status of the global environment to at least one of the plurality of agents; and
  the at least one agent of the plurality of agents processing and using the determined and reported status of the global environment as a basis of a decision-making and an action by the at least one agent.

16. The system of claim 15, wherein the determining of a status of the global environment comprises representing the calculated status at a certain level of abstraction, prior to the reporting, and involves a request for a reporting of the status.

17. The system of claim 15, wherein a notification received from one of the plurality of agents is used in at least one of generating the status of the global environment and transmitted to at least one other agent of the plurality of agents for use thereby.

18. The system of claim 15, wherein at least two of the plurality of agents provides notifications related to disjoint tasks.

19. The medium of claim 15, wherein the plurality of agents are logically grouped into a hierarchy of ranked categories, facilitating various patterns of control of information, both to and from the processor, allowing for differing levels of abstraction to be utilized at different ranks.

20. The medium of claim 15, wherein the determining of the shared situational model of the related global environment is dynamically updated based, at least in part, on the notifications received from the plurality of agents over the period of time without disruption of notification processing by the plurality of agents.

* * * * *